US009669406B2

(12) United States Patent
Manian et al.

(10) Patent No.: US 9,669,406 B2
(45) Date of Patent: Jun. 6, 2017

(54) SAMPLE ASSEMBLY FOR A MEASUREMENT DEVICE

(75) Inventors: Bala S. Manian, Los Altos Hills, CA (US); Pramod Kummaya, Bangalore (IN)

(73) Assignee: Reametrix, Inc., San Jose, CA (US)

( * ) Notice: Subject to any disclaimer, the term of this patent is extended or adjusted under 35 U.S.C. 154(b) by 627 days.

(21) Appl. No.: 13/034,476

(22) Filed: Feb. 24, 2011

(65) Prior Publication Data

US 2012/0114536 A1 May 10, 2012

(30) Foreign Application Priority Data

Nov. 8, 2010 (WO) .................. PCT/IB2010/055060

(51) Int. Cl.

| | |
|---|---|
| ***B01L 9/00*** | (2006.01) |
| ***G01N 21/00*** | (2006.01) |
| ***G01N 15/06*** | (2006.01) |
| ***G01N 21/64*** | (2006.01) |
| ***B01L 3/00*** | (2006.01) |

(52) U.S. Cl.

CPC ............. *B01L 3/5027* (2013.01); *B01L 9/527* (2013.01); *B01L 2200/027* (2013.01); *B01L 2200/028* (2013.01); *B01L 2200/148* (2013.01); *B01L 2300/0803* (2013.01); *B01L 2300/0816* (2013.01); *B01L 2400/0409* (2013.01)

(58) Field of Classification Search

CPC ......... G01N 21/6452; G01N 27/44721; G01N 2021/6463; G01N 21/6428; B01L 2200/028; B01L 3/5027; B01L 9/527; B01L 9/52; G01J 3/10; G01J 3/14; G01J 3/36; G01J 3/4406; G02B 21/0076; G02B 26/10

USPC .... 422/50, 63, 68.1, 82.07, 82.08, 401, 554, 422/561

See application file for complete search history.

(56) References Cited

U.S. PATENT DOCUMENTS

| | | | | |
|---|---|---|---|---|
| 6,653,152 | B2 | 11/2003 | Challener | |
| 6,723,288 | B2 * | 4/2004 | Devlin et al. | 422/65 |
| 6,827,901 | B2 | 12/2004 | Copeland et al. | |
| 7,423,750 | B2 | 9/2008 | Hoshizaki et al. | |
| 8,072,585 | B2 | 12/2011 | Wang et al. | |

FOREIGN PATENT DOCUMENTS

| | | | |
|---|---|---|---|
| EP | 0252632 | A2 | 1/1988 |
| EP | 0290018 | A2 | 11/1988 |
| EP | 0353589 | A2 | 2/1990 |
| EP | 0353590 | A2 | 2/1990 |
| EP | 0353591 | A2 | 2/1990 |

(Continued)

*Primary Examiner* — Dean Kwak

(74) *Attorney, Agent, or Firm* — Thomas Schneck

(57) ABSTRACT

In one aspect, the invention provides a sample assembly to be used in a fluorescent measurement device. The sample assembly comprises a sample carrier, a sample holder that comprises at least one receptacle and a movable platform. The sample carrier is shaped in such a way that it can be secured into the receptacle by a suitable locking means. The sample holder is held in place on the movable platform through any suitable means, such as for example, a magnetic means. The movable platform is capable of moving in a linear trajectory, an arcuate trajectory and combinations thereof. The movement of the movable platform and hence, the entire sample assembly is effected by at least one stepper motor.

16 Claims, 4 Drawing Sheets

(56) References Cited

FOREIGN PATENT DOCUMENTS

| | | | |
|---|---|---|---|
| EP | 0353592 | A2 | 2/1990 |
| JP | 8005345 | A | 1/1996 |
| JP | 9138235 | A | 5/1997 |
| JP | 11304699 | A | 11/1999 |
| JP | 2000304688 | A | 11/2000 |
| JP | 2001228088 | A | 8/2001 |
| JP | 2009074934 | A | 4/2009 |
| WO | WO 93/10454 | A1 | 5/1993 |
| WO | WO 94/19684 | A1 | 9/1994 |
| WO | WO 94/29024 | A1 | 12/1994 |
| WO | WO 98/00236 | A1 | 1/1998 |
| WO | WO 2009/049171 | A2 | 4/2009 |

* cited by examiner

SAMPLE ASSEMBLY FOR A MEASUREMENT DEVICE

CROSS REFERENCE TO RELATED APPLICATION

This application claims priority from International Application No. PCT/IB2010/055060, filed on Nov. 8, 2010.

FIELD OF THE INVENTION

The invention relates generally to a sample assembly for a measurement device and more specifically to a sample assembly that is versatile and may be fabricated from inexpensive methods and raw materials.

BACKGROUND OF THE INVENTION

Optical detection and measurement devices are a popular choice for many different applications. They provide the advantage of speed and accuracy of results for small sample volumes. However, the use of such devices requires carefully fabricated parts that have well-known dimensions within narrow tolerance ranges. Any deviations from these ranges will lead to erroneous results, inaccurate measurements, and sometimes even complete breakdown of the device.

JP 8005345(A) illustrates an inexpensive inspection device which can be assembled with a substrate rotation table, where a plurality of printed circuit boards are fixed; and a laser application light reception. By combining the rotation of the substrate rotation table and the movement of the laser application reception part, the laser beams are applied to the entire surface of a plurality of printed circuit boards, thus obtaining height/brightness data. However, such a device is capable of being used in limited situations only.

A sample analyzer capable of analyzing light at different wavelength bands using one analyzer is elucidated in JP 2009074934(A). It comprises a first movable stage where the sample is placed and which is capable of moving the sample in width and depth, a light source which might be X-ray, ultraviolet, visible or infrared in nature; a detector for detecting transmission light or fluorescence; a second movable stage capable of moving the detector in width and depth direction. A similar invention is perceived in JP 11304699 (A) in order to obtain a near infrared component analyzer which can simultaneously analyze a plurality of kinds of samples in parallel. JP 2000304688(A) describes a simple method to measure a specimen by a simple method of moving a detection region by a detector relative to a substrate and forming a circular track of the detection region on a measurement surface. In JP 2001228088(A), the specimen chip on which a large number of living body specimens are arranged, is scanned by light to specify living body specimens labelled with a fluorescent substance. The wavelength of the scanning light corresponds to the fluorescence of the fluorescent substance from a light source and the light, is condensed by an object lens to become a prescribed spot diameter. The reflected light and fluorescence from the specimen chip are detected by a light detection member to output an electric signal. The specimen chip, rotated while moving rectilinearly is spirally scanned by the light to detect the living body specimens, to which the fluorescent substance is bonded. But, the methods and devices described herein require samples made available in carefully fabricated parts only.

WO 9800236(A1) discloses an injection molded single piece, well container suitable for reagents for use in a clinical instrument such as a protein analyzer, normally molded from a high density polyethylene or other recyclable plastic. While this piece is inexpensive, its use is limited to single kind of analysis only, and is not adaptable to other kinds of analysis.

EP 0252632(A2) describes a reagent cartridge which is used in an automated clinical analyzer; wherein the reagent cartridge is adapted to be inserted into slots formed in a reagent cartridge storage apparatus on the automated analyzer, the reagent cartridge and slots together forming a positioning and detent mechanism which removably secures the cartridge in the slot for sure and definite positioning of the cartridge during automatic operation of the analyzer. Similarly, EP 0290018(A2) discloses an automatic analyzer with multiple dose reagent pack with a plurality of vial-receiving wells and corresponding carousel containing a plurality of radially spaced compartments. EP 0353589 (A2), EP 0353590 (A2), EP 0353591(A2) and EP 0353592 (A2) and WO 9310454(A1) discloses a semi-automated biological sample analyzer consisting a carousel holding a plurality of reaction cartridges; each reaction cartridge includes a plurality of isolated test sites formed in a two dimensional array in a solid phase binding layer contained within a reaction well which is adapted to contain a biological sample to be assayed. An optical reader operating on a principle of diffuse reflectance is provided to read the results of the assays from each test site of each cartridge. Also provided is a subsystem which provides predetermined lot-specific assay calibration data which is useful for normalizing the results of various assays with respect to predetermined common standard values. Thus, a plurality of enzyme immuno assays for human IgE class antibodies specific to a panel of preselected allergens in each of a plurality of biological samples can be performed. JP 9138235(A) describes an automatic analyzer in which a cell can be measured without being removed from a cell holder; wherein the analyzer comprises a lid which can be opened and shut and installed at a cell holder so as to cover its surface part. A cell is mounted on, and attached to, the holder, claws are hooked to the other end of the cell holder, and the lid is put on the surface of the cell holder. A shock absorbing material which is installed at the cell bottom support part of the cell holder reduces the damage of the cell due to the chock to the bottom face inside the cell of the probe. The cartridges and sample containers described herein are generally expensive, or else, they are not conducive for optical measurements, but more suited for other types of measurements, such as electrical.

WO 2009049171(A2) describes a system for conducting the identification and quantification of micro-organisms, e.g., bacteria in urine samples wherein disposable cartridges are used with their components including the optical cups or cuvettes are used in the sample processor, and the optical cups or cuvettes containing the processed urine samples are used in the optical analyzer for identifying and quantifying the type of micro-organism existing in the processed urine samples. WO 9419684(A1) discloses a method and clinical system for providing immediate analytical results for biological sera of interest, such as blood-gas analysis, at the point-of-care of a patient combines a single use disposable cartridge adapted to interface with an associated portable electroanalytical instrument used in making electrochemical determinations. WO 9429024(A1) describes a sample segment uniquely adapted for automated handling and processing wherein the sample segment may retain selected reagents and a sealing cover is held by ribs, stretched and pressed against raised bosses formed around the well openings to provide a sure seal. The processing steps involved in the preparation of a sample are generally labor-intensive and require expensive reagents. Further, despite being of a disposable nature, the sample segments and cuvettes are quite expensive to manufacture.

U.S. Pat. No. 7,423,750 describes methods and optical systems for scanning of a target sample, including methods and systems using a low mass scan head and methods and systems for conducting a scanned optically transduced assay where the scanning includes at least one first relative angular motion and at least one second angular motion or at least one linear motion. U.S. Pat. No. 6,827,901 discloses an automated immunostaining apparatus having a reagent application zone and a reagent supply zone. The apparatus has a carousel slide support supporting a plurality of slide supports thereon, and drive means engaging the carousel slide support for consecutively positioning each of a plurality of slide supports in the reagent application zone. The methods and devices are not adaptable for a variety of different assays and measurement systems, and are generally useful for only one particular kind of measurement. Further, the components used, especially the disposable ones, are quite expensive requiring accurate and precise machining to reduce the imperfections to a minimum.

Hence, there is a dire need in the art to provide a sample to a fluorescent measurement device requiring inexpensive components and little sample preparation methods such that a variety of different measurements may be conducted in a scant-resource, harsh environments.

SUMMARY OF THE INVENTION

In one aspect, the invention provides a sample assembly for a measurement device. The sample assembly comprises at least one sample carrier. The sample assembly also comprises a sample holder comprising at least one receptacle to receive the at least one sample carrier; and a movable platform, wherein the sample holder comprises a locking means to attach to the movable platform.

In another aspect, the invention provides a device that comprises the sample assembly of the invention.

BRIEF DESCRIPTION OF THE FIGURES

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As used herein and in the claims, the singular forms "a," "an," and "the" include the plural reference unless the context clearly indicates otherwise.

Figure 1:
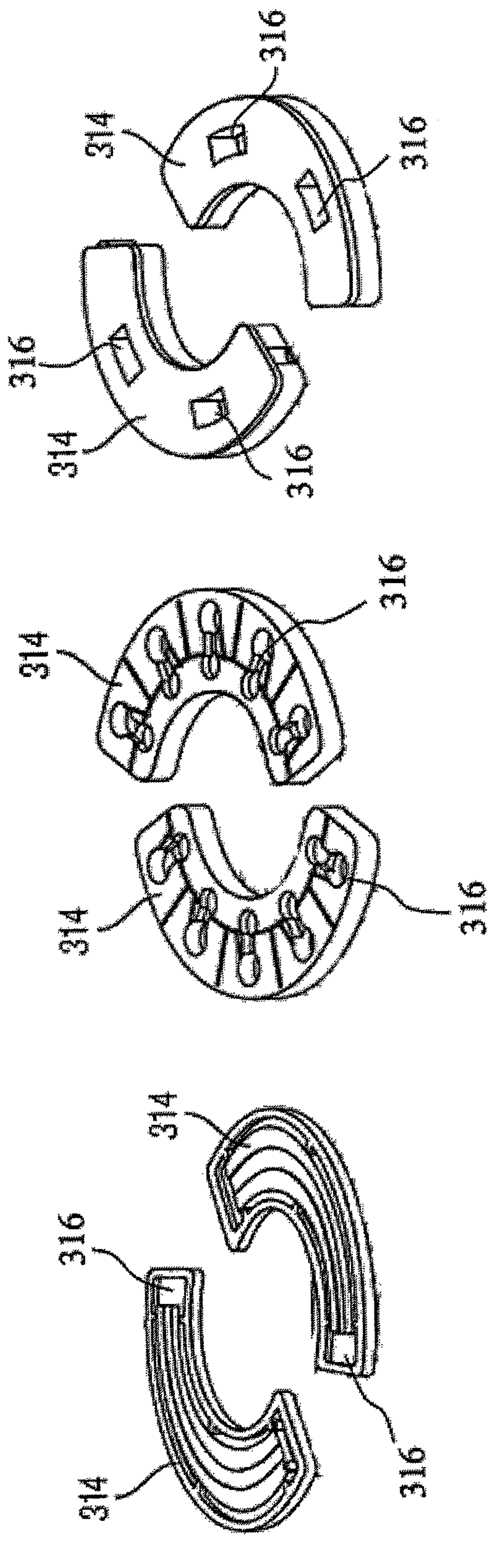
FIG. 1 shows some exemplary sample carriers of the invention.

In one aspect, the invention provides a sample assembly. The sample assembly is used to provide a sample for analysis by a fluorescence measurement device. The sample assembly comprises at least one sample carrier. The sample carrier may be any one of a cuvette, channel, well, capillary, membrane, bead and combinations thereof. FIG. 1 shows some exemplary sample carriers 314 shaped in the form of a crescent. One skilled in the art would perceive that the shape of the sample carrier could be anything as long as it can be fit properly into the sample assembly. The sample carrier has a predefined sample region to receive the sample, depicted in FIG. 1 by the numeral 316. In one embodiment, the predefined sample region 316 has a thickness that ranges from about 5 micrometers to about 500 micrometers. In another embodiment, the predefined sample region 316 of the sample carrier 314 to receive the sample has a thickness that ranges from about 50 micrometers to about 150 micrometers. Sample assembly may comprise a plurality of sample carriers, wherein all the sample carriers comprise a sample or only a few sample carriers comprise sample while the remaining are empty during operation of the device of the invention. Sample may be prepared in situ in the sample carrier or it may be prepared separately and then added into the sample carrier. In situ preparation of sample would involve having a fluorophore-containing reagent as part of the sample carrier. Adding a prepared sample into the sample carrier may be achieved by known means, such as for example pippetting. Additional steps may be required to prepare the sample for measurement, which may include, for example, mixing, vortexing, heating, incubating, and the like. Thus, additional equipment may also be required for performing such additional steps. The nature of the sample carrier may be specific for a particular application, the choice of which will be obvious to one of ordinary skill in the art. In one exemplary embodiment, the sample carrier is a cuvette, and in another exemplary embodiment, the sample carrier is a capillary.

In some instances, the sample is introduced into the sample carrier from a port, following which, the sample is allowed to flow along a predefined path. Such a situation may be in effect when, for example, sample carrier is a capillary. Other forms of sample carriers may also include predefined flow paths. In such instances, at least one portion which is transparent from at least one side. The transparent portion will allow light to pass through to perform measurements for assays.

Figures 2, 2A, 2B:
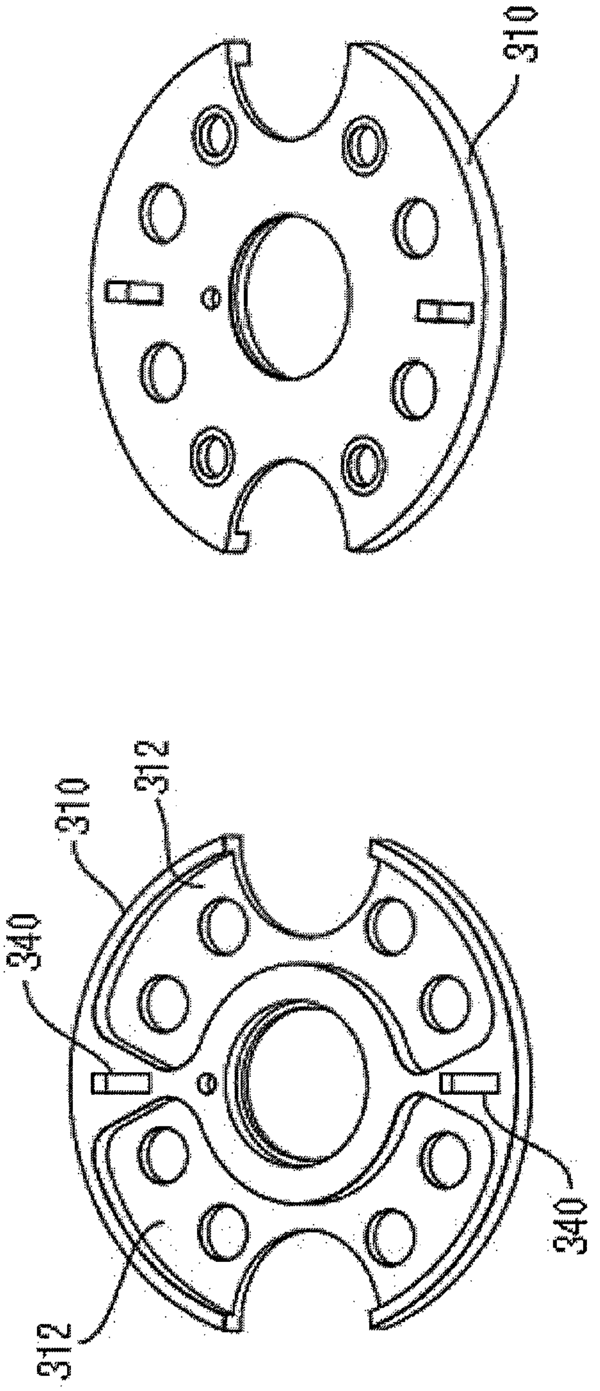
FIG. 2*a* shows the top side of an exemplary sample holder of the invention.
FIG. 2*b* shows the bottom side of an exemplary sample holder of the invention.

The sample assembly of the invention then comprises a sample holder comprising at least one receptacle to receive the at least one sample carrier. FIG. 2*a* shows the top side of the sample holder 310 and FIG. 2*b* shows the bottom side of the sample holder 310. The sample holder 310 comprises at least one receptacle 312 to receive the sample carrier 314. The receptacle 312 is shaped in such a way to receive and hold the sample carrier 314 such that the sample carrier 314 fits snugly without shaking or moving during measurement. The at least one receptacle 312 may also comprise means of securing the sample carrier 314 onto the sample holder 310. Such means of securing are known in the art, and may include, for example, fasteners, screws, bolts, magnetic means, and the like. The receptacle 312 may be shaped to take a single unique sample carrier 314, or it may be fabricated in such a manner that it can take a variety of different types of sample carriers 314. In some embodiments, the sample holder 310 may further comprise at least one predefined calibration region 340 to hold some extraneous material for other types of testing, such as a reference compound for calibration or quantitation. In other embodiments, the sample carrier may comprise at least one predefined calibration region to hold the extraneous material. The reference compound is held in the calibration region by appropriate means known to those skilled in the art. In one exemplary embodiment, the reference compound is sealed in the calibration region using a top, which is preferably transparent to light of predefined wavelengths to allow for appropriate measurements.

Figure 3:
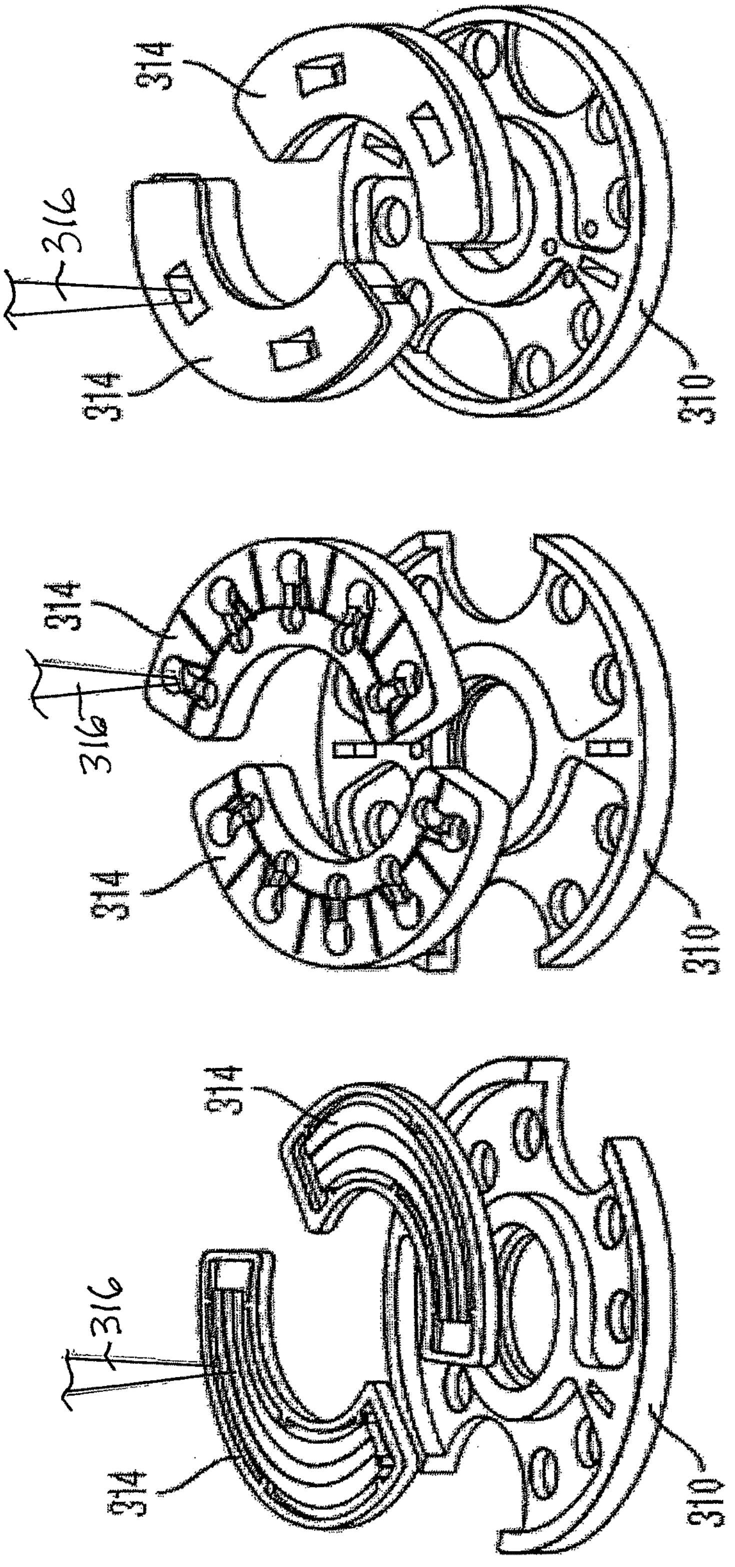
FIG. 3 shows the sample carrier and the sample holder on the verge of being locked together.

FIG. 3 shows a variety of sample carriers 314 on the verge of being secured onto the respective receptacles 312 of a sample holder 310. The sample carrier 314, the receptacle 312 and the sample holder 310 may be fabricated using any suitable material conducive for mass manufacturing, such as, but not limited to, aluminum, titanium, stainless steel, ABS, polyethylene, polypropylene, polystyrene, polyester, polycarbonate, and appropriate combinations thereof. It will also be obvious to one of ordinary skill in the art to fabricate two or more components together and provide them as a single piece. For example, the sample holder 310 and the receptacle 312 may be made available as a single piece to receive the sample carrier 314. Similarly, sample holder 310, receptacle 312 and the sample carrier 314 may be made available as a single piece.

The sample assembly then comprises a movable platform configured in such a way that it can be attached to the sample holder through a suitable locking means. Locking means are known to those of ordinary skill in the art, and may include fasteners, mechanical means, magnetic means, and the like. In one embodiment, the locking means is by magnetic means. In this situation, a magnetic material is present on at least one portion of the sample holder, and a magnetic material of the opposite polarity and suitable magnetic strength is made available at the complementary position of the movable platform. This will ensure that when the two components are brought together, they will be held strongly in place through magnetic attraction forces. In another embodiment, the locking means is through mechanical means. This includes means such as using screws, bolts, and the like.

The movable platform in the sample assembly is further capable of being moved in a suitable trajectory. The movement may be achieved by the use of a stepper motor, the mechanism of which is known in the art. The movable platform is capable of being moved in a linear trajectory, an arcuate trajectory, or both. In one embodiment, the movable platform is capable of being in both a linear and an arcuate trajectory.

Figure 4:
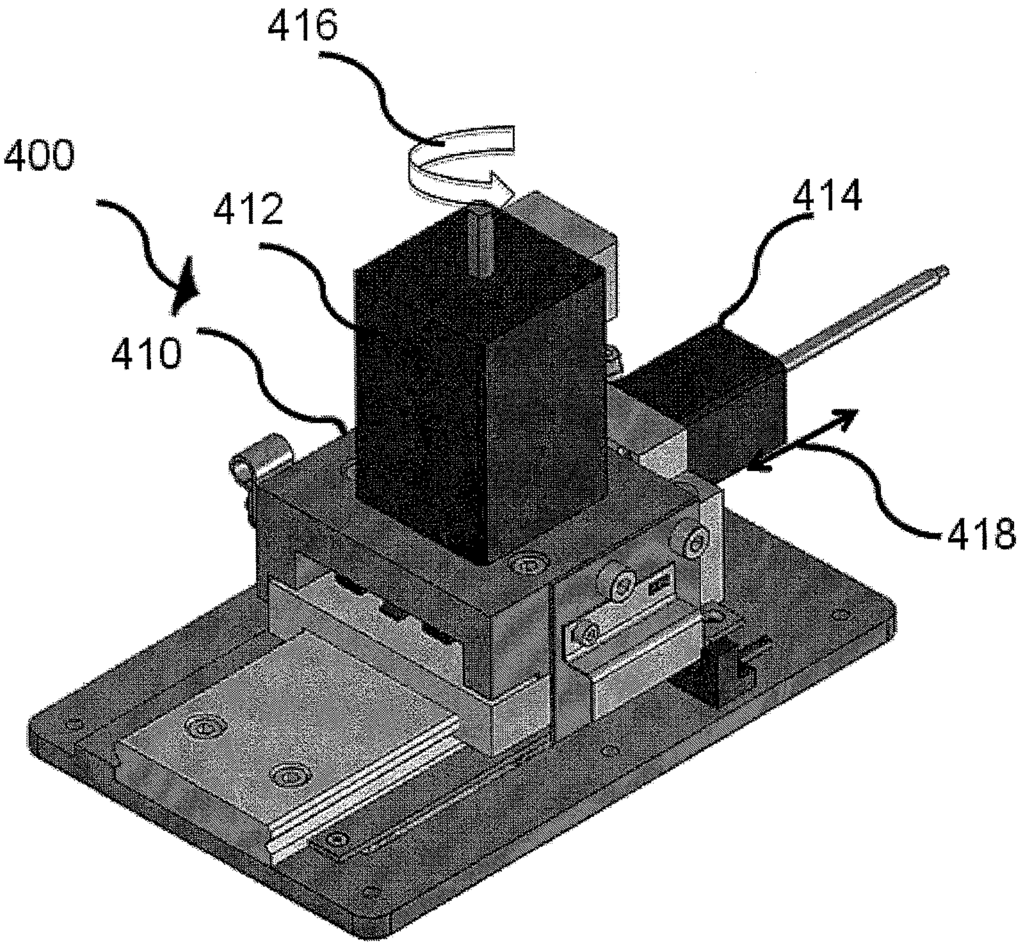
FIG. 4 shows an arrangement of the movable platform and the rotary and linear stepper motors for moving the sample assembly in linear and arcuate trajectories.

In a typical use scenario, the sample carrier 314 is loaded onto the sample holder 310, which is in turn loaded onto the movable platform as shown in FIG. 4. FIG. 4 shows an arrangement of stepper motors 400 with the movable platform 410 carrying the rotary stepper motor 412. Linear stepper motor 414 has an arm for moving the movable platform 410 in a linear trajectory. Rotary stepper motor 412 moves the sample assembly in an arcuate trajectory, shown by reference numeral 416 and linear stepper motor 414 moves the sample assembly in a linear trajectory 418. All the components are locked into place, and now form a single unit. Then, when the movable platform moves, the entire sample assembly moves. When an incident beam 316 is allowed to impinge on the sample, the movement of the sample assembly causes different portions of the sample to be illuminated by the incident beam 316, giving rise to space-dependent fluorescence signals. It will also be obvious to one of ordinary skill in the art that the entire sample assembly may be manufactured as a single unit, or as individual components. It is also important that the individual components, namely the sample carrier, the sample holder and the movable platform are secured so that when the movable platform is moving in a suitable trajectory, there is no wobble or shake of the sample carrier within the receptacle, or spilling of sample from the sample carrier.

The stepper motor used to control the movable platform may be a combination of linear stage stepper motor and a rotary stepper motor. Other kinds of stepper motors, such as, a focus stage stepper motor may also be made available for the sample assembly of the invention. The stepper motors may be controlled using a field programmable gate array (FPGA). The rotary stepper motor can be arranged to rotate the sample assembly at a constant rotational speed. The linear stage stepper motor can be arranged to continuously move the rotating sample assembly linearly during measurement. The focus stage stepper motor can be arranged to move a focusing lens up or down to a particular position (similar to a microscope) before a scanning sequence is started, and to then hold that lens position during the scanning sequence to ensure better focus of laser spot onto the sample.

In one exemplary embodiment, the rotary stage stepper motor can be a 50-pole stepper having 4 windings. The rotary stage stepper motor can be designed to rotate the sample assembly at a relatively low speed, such as, for example, 10 rpm, while providing a high level of repeatability between adjacent scans. Such a low-speed is preferable to prevent encountering problems with regard to signal-to-noise ratios. In a typical stepper motor, discrete signals are directed to a driver, resulting in the stepped motion. To prevent such a stepped motion, a look-up table can be provided for the rotary stage stepper motor which is used to direct current values to the poles of the motor so that the rotary stage stepper motor sees a uniform magnetic field resulting in the continuous rotary motion without any stepping.

According to the present teachings, an integrated, protected dual H-bridge with external components and logic can be implemented to regulate the current precisely to the stepper motors. In the design of the present teachings, no heat-sinking or active cooling is required at the expected ambient conditions and with loads of less than 1 A peak per coil. More particularly, the look-up table of the FPGA can be connected to power drivers which operate to amplify the current values after they have been converted from digital to analog signals in the digital-to-analog converters. Since there are multiple windings going into the motor, each winding can be provided with a power driver.

An encoder can be connected to the rotary stage stepper motor. By using position data from the encoder, or the frequency of the encoder signal, the angular position of the rotary motor may be tracked to ensure that the rotary motor is rotating at a constant velocity. In addition, the encoder position can also be used to monitor the motor position during starting and stopping conditions.

The focus stage stepper motor can also be controlled through a look-up table. The focus stage stepper motor can operate to adjust the focusing lens to compensate for fabrication imperfections in the sample holders and/or sample carriers, to compensate for any misalignment, tilt, and/or wobble in the sample assembly, and any other inevitable misalignments. Since it is impossible to create sample carriers which are perfectly flat, especially at the desired low-unit costs of sample carriers, it is possible to provide compensation for any such imperfections when conducting a rotary scan.

The linear stage stepper motor and the focus stage stepper motor can also be controlled by photointerrupters. One photointerrupter can be arranged for a home position on each of the linear and focus stages, and one for the sample carrier loading stage. This will ensure that the sample assembly does not run past an end point and result in erroneous and/or inaccurate results, or sometimes even complete breakdown of the sample assembly.

The sample assembly of the invention provides for inexpensive alternative to existing sample assemblies, in that the manufacturing methods need not be too intricate so that individual components of the sample assembly can be fabricated with some level of imperfections. The construction and use of the sample assembly in a suitable measurement device accounts for all the imperfections. This allows for reducing the cost of the sample assembly, and hence the entire device comprising it. Further, this also allows for point-of-care measurement devices in remote locations, especially in situations where regular resources are scant and the environment is typically harsh for operation of any other device.

Thus, in another aspect, the invention provides a device that comprises the sample assembly of the invention. The device useful in the invention is a fluorescent measurement device. Such a fluorescent measurement device may be used for a variety of applications, that include for example, assays such as immunoassays, sandwich immunoassays, competitive immunoassays, other diagnostic applications, and the like. Other exemplary applications may include measuring water purity, identifying presence of narcotics, and so on.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A sample assembly comprising:

at least one sample carrier;

a sample holder comprising at least one receptacle to receive the at least one sample carrier and form a sample assembly;

a first stepper motor disposed in an arrangement providing linear movement to the sample assembly;

a second stepper motor disposed in an arrangement providing continuous rotational movement to the sample assembly wherein the first stepper motor and the second stepper motor have simultaneous linear and rotational movement of the sample assembly; and an incident beam impinging on the sample assembly and exciting fluorescence therein wherein movement of the sample assembly during linear and rotational movement causes different portions of the sample to be illuminated by the incident beam giving rise to space-dependent fluorescent signals.

2. The sample assembly of claim 1 further comprising a locking means to attach the sample holder to a movable platform.

3. The sample assembly of claim 2, wherein the locking means is mechanical or magnetic.

4. The sample assembly of claim 1, wherein the at least one sample carrier is a cuvette.

5. The sample assembly of claim 1, wherein the sample carrier is a capillary.

6. The sample assembly of claim 1, wherein the at least one receptacle is made of a material selected from the group consisting of aluminum, titanium, stainless steel, ABS, polyethylene, polypropylene, polystyrene, polycarbonate, and polyester.

7. The sample assembly of claim 1, wherein the at least one sample carrier comprises a predefined sample region for receiving a sample.

8. The sample assembly of claim 7, wherein the predefined sample region has a thickness that ranges from about 5 micrometers to about 500 micrometers.

9. The sample assembly of claim 8, wherein the predefined sample region has a thickness that ranges from about 50 micrometers to about 150 micrometers.

10. The sample assembly of claim 7, wherein the sample comprises at least one fluorescent dye.

11. The sample assembly of claim 7, wherein the sample carrier further comprises a predefined calibration region.

12. The sample assembly of claim 1, wherein the sample holder further comprises a predefined calibration region.

13. The sample assembly of claim 1, wherein the sample carrier comprises at least one transparent portion.

14. A measurement device comprising the sample assembly of claim 1.

15. An assay device comprising the sample assembly of claim 1.

16. A diagnostic device comprising the sample assembly of claim 1.

* * * * *